United States Patent [19]

Kesting

[11] 4,035,457
[45] July 12, 1977

[54] NONBIODEGRADABLE POLYMERS

[75] Inventor: Robert E. Kesting, Irvine, Calif.

[73] Assignee: Chemical Systems Incorporated, Irvine, Calif.

[21] Appl. No.: 573,783

[22] Filed: May 1, 1975

[51] Int. Cl.² .................... B29D 27/04; B29D 7/02
[52] U.S. Cl. ............................ 264/41; 210/500 M; 536/31; 536/64; 536/65
[58] Field of Search ............... 260/225; 210/500 M; 264/41; 536/31, 64, 65

[56] References Cited

U.S. PATENT DOCUMENTS

| | | | |
|---|---|---|---|
| 1,969,468 | 8/1934 | Malm et al. | 260/225 |
| 2,348,305 | 5/1944 | Olpin et al. | 260/229 |
| 3,373,056 | 3/1968 | Martin | 264/41 |
| 3,423,491 | 1/1969 | McLain et al. | 264/49 |
| 3,585,126 | 6/1971 | Cannon et al. | 210/500 M |
| 3,674,719 | 7/1972 | Jenkins | 260/2.5 M |
| 3,792,135 | 2/1974 | Brown et al. | 264/49 |
| 3,806,564 | 4/1974 | Riley et al. | 264/41 |
| 3,852,388 | 12/1974 | Kimura | 210/500 M |
| 3,884,801 | 5/1975 | Kesting | 210/500 M |

OTHER PUBLICATIONS

Izard et al., Industrial and Engineering Chemistry, vol. 41, pp. 617–621, (1949).
Malm et al., Industrial and Engineering Chemistry, vol. 42, pp. 1547–1550, (1950).

*Primary Examiner*—Ronald W. Griffin
*Attorney, Agent, or Firm*—Knobbe, Martens, Olson, Hubbard & Bear

[57] ABSTRACT

A new composition, cellulose acetate-chlorobutyrate pyridinium salt, which has superior biodegradation resistance and polymer membrane forming characteristics and related compositions.

8 Claims, No Drawings

NONBIODEGRADABLE POLYMERS

This invention relates to compositions which possess resistance to biodegradation and which are capable of being formed by extrusion, spinning, casting, or otherwise into various shapes, configurations and forms. The compositions are particularly well adapted to be formed as permselective membranes. These membranes may be in various configurations, such as flat films, hollow fibers, etc.

Cellulose acetate was one of the first polymeric materials used industrially and has found almost numberless applications in science and industry. More recently, mixed cellulose esters, e.g., cellulose acetate-butyrate, cellulose acetate-propionate, and the like have found wide application in industry. Cellulose acetate and mixed cellulose esters are widely used in films of various types. Another important application of the cellulose ester family is in the field of permselective membrane fabrication.

Cellulose acetate and mixed cellulose esters have many desirable characteristics but are subject to biological degradation through enzyme action, bacterial attack, etc. Membranes are particularly susceptible to biological attack because of the extremely high surface area inherent in membrane structure.

In membranes intended for biological usage, the importance of preventing any biological growth and the desirability of inhibiting biological growth without contaminating body fluids is paramount. In the past, various dialysis apparatus containing cellulosic membranes have been constructed. The preparation and handling of these membrane containing structures has presented serious obstacles to their wide spread adoption. Cellulosic membranes, generally, must be stored in an aqueous solution. Because of the high susceptibility to biodegradation and the favorable environment for bacterial growth provided by the high surface area of cellulosic membranes, it has generally been necessary to store cellulosic membrane containing structures in formaldehyde solution or in some other bactericidal preservative solution before use. Since these bactericidals are, generally, toxic or their presence interferes with the proper biological function of the apparatus, it has been necessary in the past to expend considerable effort and time in repeated flushing of the membrane to ensure its freedom from the preservative solution. In addition, it has been difficult to ensure integrity of cellulosic membranes through long periods of storage, through repeated use, or following exposure to aseptic conditions.

Quaternary ammonium compounds are well known for their bactericidal characteristics. Pyridinium based quaternary amines, generally in the form of chloride salt, are widely used as bactericidal agents.

Cellulose acetate-chloroacetate was reported as early as the 1930's (1–4) and cellulose acetate-chloroacetate tertiary amine derivatives have been described (5–10). Mixed ester preparation generally, and the methods for preparing these compounds are well known (1).

Preparation of films and membranes (12–14) of cellulose acetate and other cellulose esters using a great variety of techniques has been described. Notwithstanding the enormous volume of literature describing membrane forming materials and processes, see Kesting (12) and the references cited therein, it has not been possible reliably to predict the suitability of a polymer system for membrane formation from characteristics of related polymers. For example, it has been generally believed that the inclusion of a highly polar or ionic substituents to a polymer system, especially a positively charged ionic substituent, was detrimental to the membrane formability of a polymer.

As an offshoot of work directed toward the preparation of a different series of compounds, a series of cellulose acetate derivatives, cellulose acetate-chloroacetate pyridinium salt, cellulose acetate-chloropropionate pyridinium salt, cellulose acetate-chlorobutyrate pyridinium salt and cellulose acetate-chlorovalerate pyridinium salt were prepared. These materials were intended as intermediates in the preparation of another series of compounds but, since the materials were on hand, and because membrane forming equipment was readily available, a series of membranes were prepared. Quite unexpectedly, the membranes which resulted were superior in most respects to any cellulose based membranes ever before observed in some twenty years of experience. One of the most surprising aspects of the new result was that these highly superior membranes were prepared on the very first effort. In usual practice, a great deal of manipulation with processing conditions, concentrations, temperatures, etc., is required to produce a membrane which is integral and uniform. The result was all the more startling since it would have been predicted and, indeed, had been believed, that if membranes could be formed at all, they would possess inferior properties. In addition, the membranes which were formed have a very high resistance to biodegradability, as well as possessing superior performance characteristics compared with other cellulose mixed esters previously used for reverse osmosis membranes.

Cellulose acetate membranes with a degree of substitution (DS) of 2.4–2.5 are quite tractable and hence are utilized to prepare reverse osmosis (RO) membranes, despite their less than optimum salt retention, hydrolytic instability and lack of resistance to biological degradation. Cellulose triacetates, on the other hand, are superior membrane polymers, with respect to their end use characteristics, but are inferior with respect to processing. Various polymers or polymer blends have been utilized to improve the end use characteristics while attempting to maintain processibility. Among the blends which have been soutilized are cellulose acetate-cellulose triacetate blends, cellulose acetate-propionates, cellulose acetate-butyrates, cellulose acetate-isobutyrates, cellulose acetate-methcrylates, all of which gave satisfactory or improved results. Now, quite unexpectedly, it has been discovered that quaternary ammonium salts of cellulose acetate-chloroacetate, cellulose acetate-$\beta$-chloropropionate, cellulose acetate-[-chlorobutyrate and cellulose acetate-Γ-chlorovalerate polymers are not only resistant to biodegradation but also can be converted into superior RO membranes as well as into films and other structures which possess resistance to biodegradation. The cellulose acetate-chloroacylates are typically quaternized with pyridine, 2, 6 lutidine, or equivalent nitrogen heterocyclic amine.

These compounds are prepared using known preparatory methods, see Malm (10) and the references cited therein. In general, quaternary ammonium salts of cellulose acetate-chloroacylates are prepared reacting a commercially available acetate in a suitable solvent, such as acetone or dioxane, containing the tertiary amine and the chloroacyl chloride so that the acylation and quaternization occur simultaneously. The polymers are then precipitated and dried prior to incorporation into suitable casting solutions for preparation of RO membranes by wet, dry or melt-spinning processes, see Kesting (12) and other references which describe membrane forming techniques (e.g. 13-14).

EXAMPLE I

The pyridinium salt of cellulose acetate-chloroacetate was formed as described above. The acetyl content of the starting material was 40%. The resulting polymer included 0.145% nitrogen and 1.74% chlorine. A membrane casting solution was prepared containing the polymer — 17 parts, acetone - 70 parts, isobutanol — 68 parts, and water — 5 parts. This solution was cast to 0.010 inches thickness at 21° C and 54% relative humidity, then dried to completion. The membrane was tested as a RO membrane. A product flux of 22 gallons/ft²day was obtained with 94% rejection of a 0.5% sodium chloride feed at 25° C and 400 PSIG.

EXAMPLE II

A new composition of matter, cellulose acetate-Γ-chlorobutyrate pyridinium hydrochloride salt was prepared from cellulose acetate having a 40% acetyl content. The final product contained 0.465% nitrogen and 2.21% chlorine. A casting solution consisting of polymer — 17 parts, ethylene formal — 70 parts, water — 2 parts, isobutanol — 58 parts, and butylacetate — 6 parts, was prepared and cast to 0.01 inch thickness at 21° C and 49% relative humidity, and dried to completion. The membrane had excellent physical characteristics and, upon tests, gave a product flux of 18± 3.83 gallons/ft²day at 90.9% rejection for a 0.5% sodium chloride feed at 25° C and 400 PSIG.

It will be apparent from the examples that the membranes which were formed from the new polymers are highly attractive and useful as film forming materials and have particular and unexpected advantages in the formation of membrane film and membranes generally. The examples are given to illustrate, not to limit the invention, and it will be apparent that there are many variations, modifications and adaptations of the principles of this invention which can be made without departing from the spirit and scope of the invention as defined in the claims.

References Cited in the Specification

1. British Pat. No. 320,842, Oct. 18, 1929, Dreyfus.
2. Swiss Pat. No. 145,979, 1930, Drya.
3. British Pat. No. 306,132, 1932, I.G. Farbenindustrie, A.-G.
4. French Pat. No. 672,220, 1929, Soc. Usines Chimiques Rhone-Poulenc.
5. French Pat. No. 717,524, Gesell. fur Chem. Ind., Bosel.
6. German Pat. No. 550,259, May 5, 1932, Gesell. fur Chem. Ind., Bosel.
7. Swiss Pat. No. 148,491, Oct. 10, 1931, Gesell fur Chem. Ind., Bosel.
8. Swiss Pat. Nos. 150,789 and 150,790, Feb. 2, 1932, Gesell fur Chem. Ind., Bosel.
9. Olpin et al., U.S. Pat. No. 2,348,305, May 9, 1944.
10. Malm, et al., Ind. Eng. Chem., 42, 1547 (1950).
11. Izard, et al., Ind. Eng. Chem., 41, 617(1949).
12. Kesting, R.E., Synthetic Polymeric Membranes, McGraw-Hill, New York, 1971.
13. Jenkens, F.E., U.S. Pat. No. 3,674,719, July 4, 1972.
14. McLain, E.A., et al., U.S. Pat. No. 3,423,491, Jan. 21, 1969.

What is claimed is:
1. The method of forming membranes comprising the steps of reacting cellulose acetate with an acyl chloride selected from the group consisting of chloro-acetyl chloride, β-chloropropionyl chloride, Γ-chloro-butynyl chloride and Γ-chlorovaleryl chloride and with a pyridinium based tertiary amine to form a cellulose acetate-chloroacylate quaternary ammonium salt, forming a membrane casting solution of the cellulose acetate-chloroacylate quaternary ammonium salt in a solvent therefor mixed with a non-solvent liquid therefor, and casting the solution to form an asymmetric membrane by the phase inversion process.
2. The method defined in claim 1 wherein the acyl chloride is Γ-chloro-butyryl chloride and the solvent comprises ethylene formal.
3. The method of forming membranes comprising dissolving the quaternary ammonium salt of cellulose acetate-chloroacetate, cellulose acetate-chloropropionate, cellulose acetate-chlorobutyrate or cellulose acetate-chlorovalerate into a solution consisting essentially of a solvent for the salt and a non-solvent for the salt and casting the solution into a thin layer to form by the phase inversion process an integral biodegradation resistant cellulose based asymmetric microporous permselective membrane.
4. The method defined in claim 3 wherein the salt is a pyridinium based quaternary ammonium salt of cellulose acetate-chlorobutyrate and the solvent comprises ethylene formal.
5. The product of the process of claim 1.
6. The product of the process of claim 2.
7. The product of the process of claim 3.
8. The product of the process of claim 4.

* * * * *